United States Patent
Yun et al.

(10) Patent No.: US 10,572,382 B2
(45) Date of Patent: Feb. 25, 2020

(54) METHOD OF OPERATING DATA STORAGE DEVICE AND METHOD OF OPERATING DATA PROCESSING SYSTEM INCLUDING THE SAME

(71) Applicant: SAMSUNG ELECTRONICS CO., LTD., Suwon-si, Gyeonggi-do (KR)

(72) Inventors: Hyun-Sik Yun, Hwaseong-si (KR); Youn Won Park, Suwon-si (KR); Sang Yoon Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 10 days.

(21) Appl. No.: 14/721,480

(22) Filed: May 26, 2015

(65) Prior Publication Data
US 2019/0213122 A1 Jul. 11, 2019

(30) Foreign Application Priority Data

Jun. 30, 2014 (KR) .................. 10-2014-0080460

(51) Int. Cl.
*G06F 12/00* (2006.01)
*G06F 13/00* (2006.01)
*G06F 12/02* (2006.01)
*G06F 3/06* (2006.01)

(52) U.S. Cl.
CPC ........ *G06F 12/0253* (2013.01); *G06F 3/0605* (2013.01); *G06F 3/0631* (2013.01); *G06F 3/0679* (2013.01); *G06F 12/0246* (2013.01)

(58) Field of Classification Search
CPC . G06F 12/0223; G06F 12/023; G06F 12/0246
See application file for complete search history.

(56) References Cited

U.S. PATENT DOCUMENTS

| | | | |
|---|---|---|---|
| 7,254,592 B1 | 8/2007 | Matero | |
| 7,310,711 B2 | 12/2007 | New et al. | |
| 7,360,031 B2 | 4/2008 | Lakshmanamurthy et al. | |
| 7,383,290 B2 | 6/2008 | Mehra et al. | |
| 7,454,566 B1* | 11/2008 | Overby | G06F 3/0607 711/100 |
| 8,266,365 B2 | 9/2012 | Lasser | |
| 8,266,391 B2 | 9/2012 | Tomlin et al. | |
| 2007/0011416 A1 | 1/2007 | Lee | |
| 2009/0172217 A1* | 7/2009 | Nochimowski | G06F 3/0607 710/38 |
| 2010/0017558 A1* | 1/2010 | Fruin | G06F 3/0607 711/103 |

(Continued)

FOREIGN PATENT DOCUMENTS

| | | |
|---|---|---|
| JP | 06332777 | 12/1994 |
| JP | 2002082833 | 3/2002 |
| KR | 101220607 | 1/2013 |

*Primary Examiner* — Sean D Rossiter
(74) *Attorney, Agent, or Firm* — Volentine, Whitt & Francos, PLLC

(57) ABSTRACT

A method of operating a data storage device includes receiving size information of a region needed for a data transaction from a host, calculating the sum of a size of a first region available in an invisible region-to-user and a size of a second region available in a visible region-to-user based on the size information, and communicating a response indicating possibility of the data transaction to the host based on a calculation result.

14 Claims, 11 Drawing Sheets

(56) References Cited

U.S. PATENT DOCUMENTS

| | | | |
|---|---|---|---|
| 2012/0078982 A1* | 3/2012 | Massarenti | G06F 12/0269 |
| | | | 707/813 |
| 2015/0154105 A1* | 6/2015 | Chaurasia | G06F 3/0608 |
| | | | 711/154 |
| 2016/0342476 A1* | 11/2016 | Nazari | G06F 12/0246 |
| 2017/0262228 A1* | 9/2017 | Kanno | G06F 3/0604 |
| 2017/0269846 A1* | 9/2017 | Zhang | G06F 3/067 |

* cited by examiner

METHOD OF OPERATING DATA STORAGE DEVICE AND METHOD OF OPERATING DATA PROCESSING SYSTEM INCLUDING THE SAME

CROSS-REFERENCE TO RELATED APPLICATIONS

This application claims priority under 35 U.S.C. § 119(a) from Korean Patent Application No. 10-2014-0080460 filed on Jun. 30, 2014, the subject matter of which is hereby incorporated by reference.

BACKGROUND

Embodiments of the inventive concept relate generally to methods of operating a data storage device. More particularly, embodiments of the inventive concept relate to a methods of operating a data storage device wherein the size of a user region in memory may be increased by reducing the size of a reserved region in memory.

Portable electronic devices must operate reliably despite a limited quantity of hardware, firmware and software resources. Portable electronic devices, such as smart phones and tablet personal computers (PCs), update a constituent operating system (OS) image using techniques commonly referred to as firmware over-the-air (FOTA). In order to accommodate FOTA updates, it is conventionally necessary for portable electronic devices to reserve a first memory region of sufficient size to temporarily store a "new" OS image. Thus, the first memory region must always be reserved in available memory despite being used only when the OS image is updated, and since the first memory region is relatively large this constitutes a waste of valuable OS memory resources.

Further, once a new OS image is stored in (or downloaded to) the first memory region, the existing (or "old") OS image is overwritten with the new OS image in a second memory region. Hence, two write operations are usually required, and given the relatively large size of an OS image, the time required to successfully perform an OS image update may be quite long.

Additionally, should a sudden power off (SPO) event occurs while the old OS image in the second memory region is being overwritten with the new OS image from the first memory region, the entire new OS image stored in the first memory region must usually be rewritten to the second memory region from the beginning.

SUMMARY

Certain embodiments of the inventive concept provide data storage devices and related operating methods that allow at least some part of a "OS-update reserved memory region" (i.e., a region of memory allocated for use during the update an operating system (OS) image) to be used as part of a "user-data memory region" (i.e., a region of memory allocated for use in storing user data). In this manner, the effective size of user-data memory region may be increased, transaction data write reliability may be improved, and the overall processing speed of electronic devices capable of updating an OS image may be improved even in circumstances wherein a sudden power off (SPO) event occurs.

According to some embodiments of the inventive concept, there is provided a method of operating a data storage device. The method includes receiving size information of a region needed for a data transaction from a host, calculating a sum of a size of a first region available in an invisible region-to-user and a size of a second region available in a visible region-to-user based on the size information, and communicating a response indicating possibility of the data transaction to the host based on the calculation result. The invisible region-to-user may include an over-provisioning region.

The second region may include a used region which will be a free region through garbage collection in the visible region-to-user. The garbage collection may be performed based on a flag output from the host in response to the response.

The method may further include changing the flag when an actually available region corresponding to the sum is secured due to the garbage collection and communicating a changed flag to the host to allow the host to start the data transaction.

The method may further include receiving transaction data from the host based on the changed flag, assigning a logical address of the transaction data to a virtual map index among a real map index and the virtual map index, and writing the transaction data to a first data region in the actually available region using a virtual mapping table corresponding to a number given to a first super block corresponding to the virtual map index.

The method may further include changing a number given to a second super block corresponding to the real map index into the number given to the first super block after the writing the transaction data to the first data region is completed and communicating an indicator signal indicating completion of change to the host.

The method may further include receiving a read command from the host; assigning the logical address corresponding to the read command to the real map index; and reading the transaction data from the first data region using the virtual mapping table corresponding to the number given to the first super block corresponding to the real map index and communicating the transaction data that has been read to the host.

The method may further include receiving an end signal indicating termination of the data transaction from the host, changing a number given to a second super block corresponding to the real map index into the number given to the first super block in response to the end signal, and communicating an indicator signal indicating completion of change to the host.

The method may further include receiving transaction data from the host based on the response, assigning a logical address of the transaction data to a virtual map index among a real map index and the virtual map index, and writing the transaction data to a first data region in the actually available region using a virtual mapping table corresponding to a number given to a first super block corresponding to the virtual map index.

According to other embodiments of the inventive concept, there is provided a method of operating a data processing system which includes a data storage device and a host. The method includes the data storage device receiving size information of a region needed for a data transaction from the host, the data storage device calculating a sum of a size of a first region available in an invisible region-to-user and a size of a second region available in a visible region-to-user based on the size information, and the data storage device communicating a response indicating possibility of the data transaction to the host based on the calculation result.

The method may further include receiving transaction data from the host based on the response, assigning a logical address of the transaction data to a virtual map index among a real map index and the virtual map index, writing the transaction data to a first data region in the actually available region using a virtual mapping table corresponding to a number given to a first super block corresponding to the virtual map index, changing a number given to a second super block corresponding to the real map index into the number given to the first super block after the writing the transaction data to the first data region is completed, and communicating an indicator signal indicating completion of change to the host.

Alternatively, the method may further include receiving transaction data from the host based on the response, assigning a logical address of the transaction data to a virtual map index among a real map index and the virtual map index, writing the transaction data to a first data region in the actually available region using a virtual mapping table corresponding to a number given to a first super block corresponding to the virtual map index, receiving an end signal indicating termination of the data transaction from the host, changing a number given to a second super block corresponding to the real map index into the number given to the first super block in response to the end signal, and communicating an indicator signal indicating completion of change to the host.

BRIEF DESCRIPTION OF THE DRAWINGS

The above and other features and advantages of the inventive concept will become more apparent upon consideration of certain exemplary embodiments with reference to the attached drawings in which.

DETAILED DESCRIPTION

Figure 1:
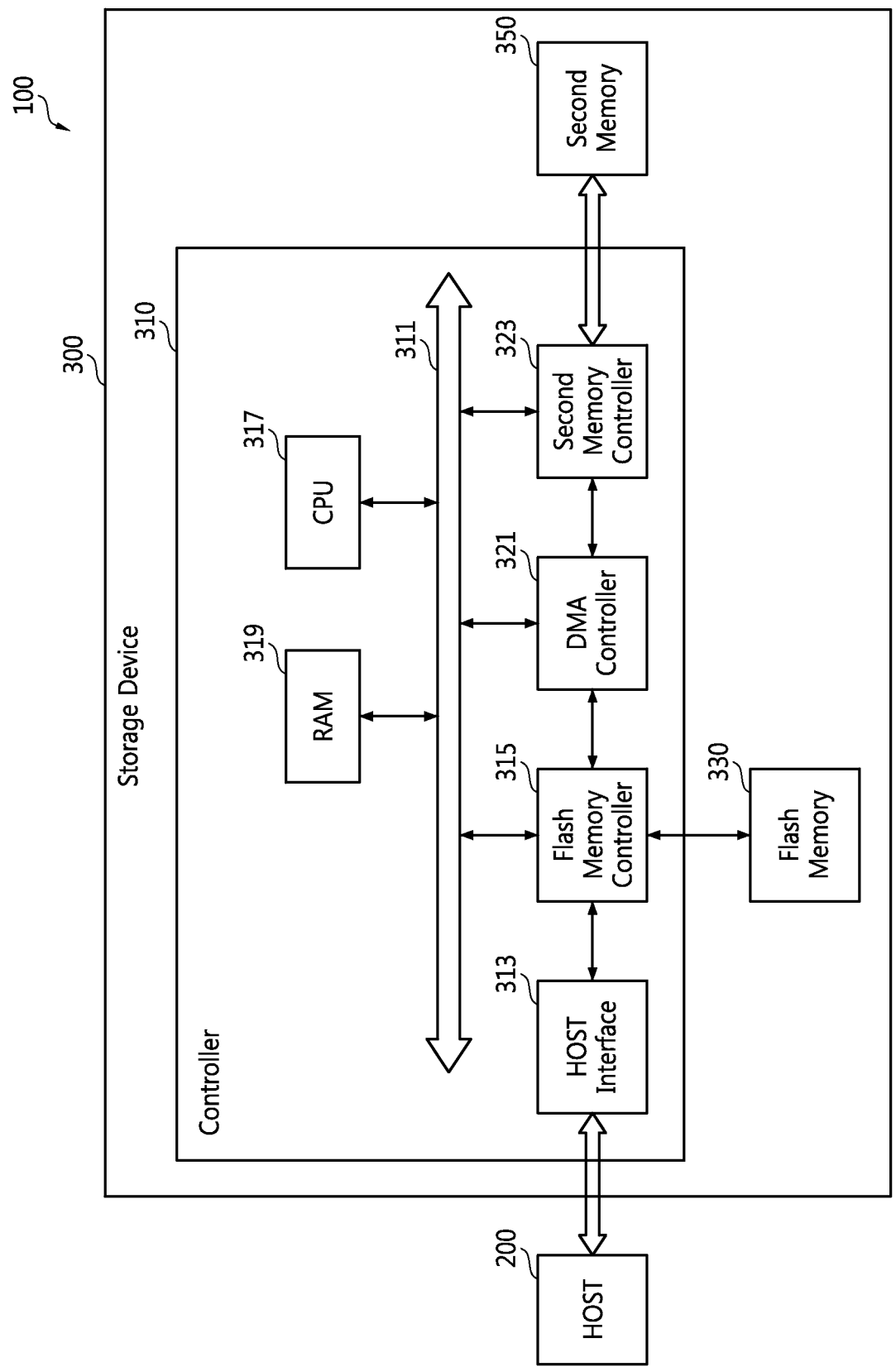
FIG. 1 is a block diagram illustrating a data processing system according to certain embodiments of the inventive concept.

Certain embodiments of the inventive concept will now be described in some additional detail with reference to the accompanying drawings. This inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, a context ID indicates an identifier that identifies a transaction context (CONTEXT) which includes parameters or information defining an operation to be performed according to the context ID. The context ID and the transaction context may be included in a command or data packet. A data transaction may indicate a write operation. A host may communicate a command including a context ID and/or a response including the context ID with a data storage device.

Figure (FIG. 1 is a block diagram of a data processing system 100 according to certain embodiments of the inventive concept. The data processing system 100 generally includes a host 200 and a data storage device 300. The data processing system 100 may be implemented as a personal computer (PC), a device that can provide a database service, a network-attached storage (NAS), or a portable electronic device. The portable electronic device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The host 200 is a generic representation of a device capable of controlling the operation of the data storage device 300. For example, the host 200 may control write operations that write (or program) "write data" to the data storage device 300, read operations that retrieve designated "read data" from the data storage device 300, etc. The host 200 may be an integrated circuit (IC), a system on chip (SoC), an application processor (AP), a mobile AP, or a portable electronic device to which the data storage device 300 can be connected.

The data storage device 300 may be a flash-based memory device. The flash-based memory device may be implemented as a solid state drive (SSD), a universal flash storage (UFS), a multimedia card (MMC), an embedded MMC (eMMC), a memory card, or a non-volatile memory express (NVMe). However, the data storage device 300 is not restricted to the flash-based memory device and may be implemented using magnetic random access memory (MRAM), spin-transfer torque MRAM, ferroelectric RAM (FeRAM), phase-change RAM (PRAM), or a resistive RAM (RRAM). The data storage device 300 may include a controller 310, a first memory 330, and a second memory 350.

The controller 310 may be used to read and execute firmware, and may further be used to control the overall operation of the data storage device 300. Constituent firmware may include firmware that controls the execution of various operations (e.g., an operation generating a virtual map, a re-map operation, etc.), firmware that performs address translation in relation to a flash translation layer (FTL), etc. In certain embodiments of the inventive concept consistent with the configuration shown in FIG. 1, firmware, wholly or in part, may be stored in the second memory 350.

The first memory 330 may be used as a cache or buffer memory. The first memory 330 may be implemented using dynamic RAM (DRAM) but is not restricted thereto. Although the first memory 330 is illustrated in FIG. 1 as being externally provided relative to the controller 310, in other embodiments of the inventive concept the first memory 330 will be internally disposed within the controller 310.

The second memory 350 may be used to store user data and/or metadata, and may be implemented as described above as a flash-based memory, but is not restricted thereto.

The controller 310 of FIG. 1 includes at least one bus 311, a host interface 313, a first memory controller 315, a central processing unit (CPU) 317, a RAM 319, a direct memory access (DMA) controller 321, and a second memory controller 323.

The host interface 313 may be used as an interface between the host 200 and controller 310 to communicate command(s), address(es), data, and/or various control signal(s) (hereafter, singularly or collectively in any reasonable combination, "CAD signals"). The first memory controller 315 may be used to communicate CAD signals from the host interface 313 to the bus 311 or to the first memory 330.

The CPU 317 may be used to execute firmware. The RAM 319 may be used as an operating memory for the CPU 317. The DMA controller 321 may be used to communicate data with the first memory controller 315 under the control of the CPU 317 or the second memory controller 323.

The second memory controller 323 may be used to write data to the second memory 350 or read data from the second memory 350 under the control of the CPU 317 or the DMA controller 321. During a write operation, write data received from the host 200 may be stored in the first memory 330 via the host interface 313 and first memory controller 315. Then, the write data stored in the first memory 330 may be transferred to the second memory 350 via the DMA controller 321 and second memory controller 323. During a read operation, read data retrieved from the host 200 may be read from the second memory 350 by the second memory controller 323 and then stored in the first memory 330 by the DMA controller 321. Then, the read data may be communicated from the first memory 330 to the host 200 via the first memory controller 315 and host interface 313.

Figure 2:
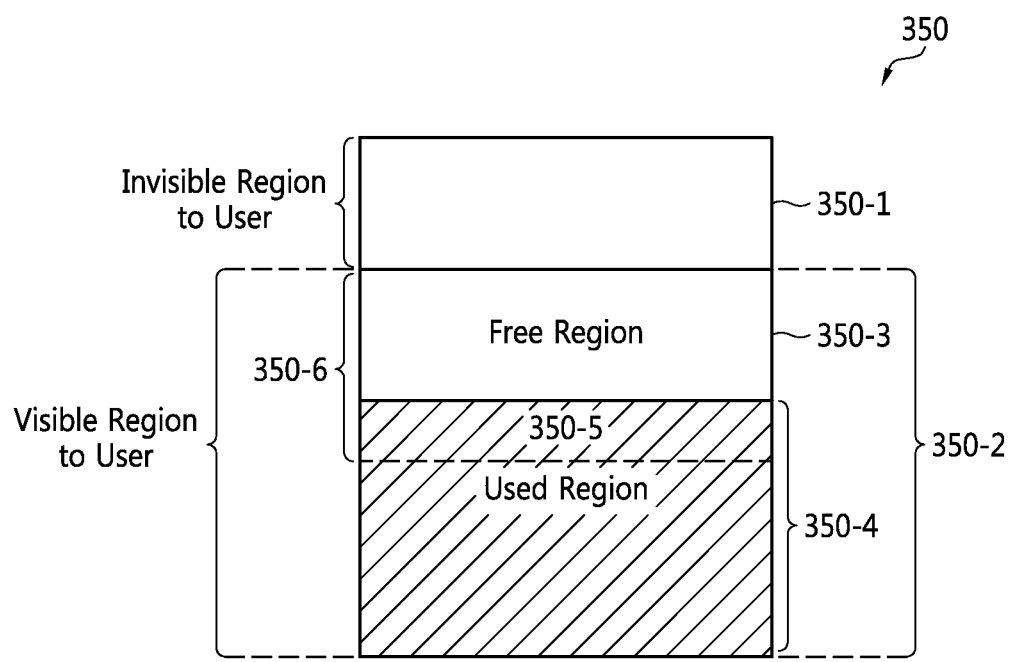
FIG. 2 is a conceptual diagram illustrating in one example a logical structure that may be used to implement the second memory 350 of FIG. 1.

FIG. 2 is a conceptual diagram illustrating in one example a logical structure of the second memory 350 shown in FIG. 1. Referring to FIG. 2, the logical structure of the second memory 350 may include one region 350-1 that is functionally "invisible" to a user or the host 200 (hereafter, the "invisible region-to-user") and another region 350-2 that is functionally "visible" to the user or the host 200 (hereafter, the "visible region-to-user").

The invisible region-to-user 350-1 may include a firmware region, a region reserved for bad blocks, and/or an over-provisioning region. For instance, a portable electronic device, such as a smart phone or a tablet PC, is able to update an operating system (OS) image in the invisible region-to-user 350-1 using various firmware over-the-air (FOTA) approaches. In conventional operating methods, some memory region analogous to the entire invisible region-to-user 350-1 would necessarily be reserved at all times in the second memory in order to temporarily store an OS image associated with FOTA.

However, certain embodiments of the inventive concept provide an operating method that uses at least part of the invisible region-to-user 350-1 as a user-data memory region capable of storing user data in order to effectively increase the size of the memory allocated to store data received from a user or the host 200. The visible region-to-user 350-2 includes a free region 350-3 and a used region 350-4. The used region 350-4 includes a region 350-5 that may be changed into a free region through the execution of one or more conventionally understood garbage collection process(es).

Figure 3:
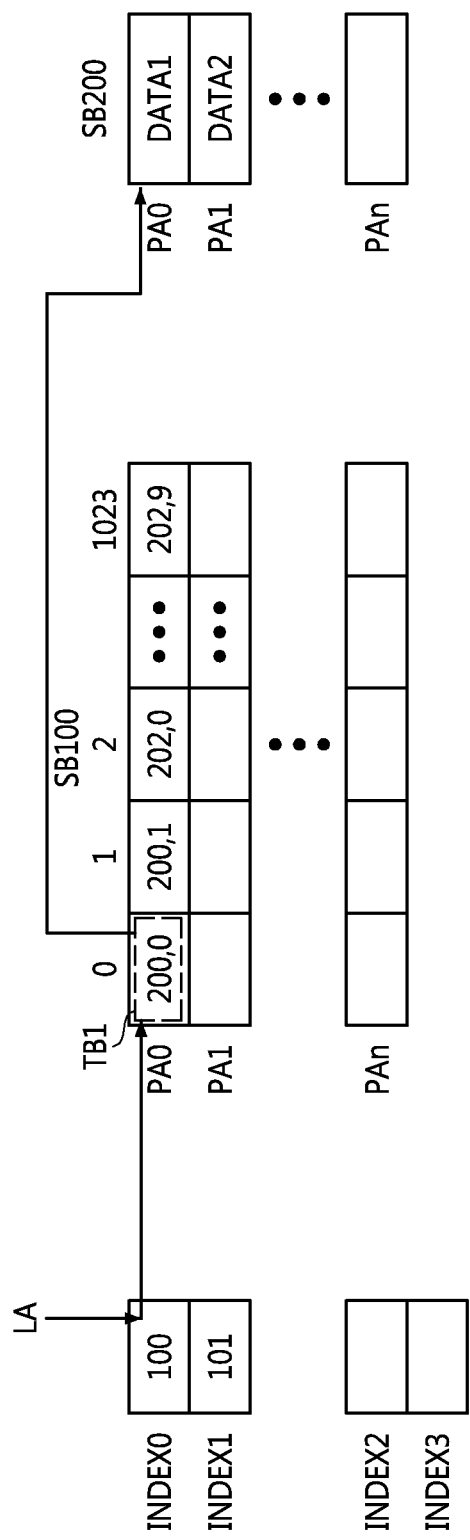
FIG. 3 is a conceptual diagram illustrating in one example a 2-level mapping approach that may be used in some embodiments of the inventive concept.

FIG. 3 is a conceptual diagram illustrating in one example 2-level mapping according to certain embodiments of the inventive concept. FIG. 3 illustrates a map search flow when data is read from a region corresponding to a logical address (LA) of 0.

Reference characters INDEX0 and INDEX1 denote real map indexes and reference characters INDEX2 and INDEX3 denote virtual map indexes. Accordingly, the virtual map indexes INDEX2 and INDEX3 are indexes added in the context of an embodiments of the inventive concept.

Conventionally, a super block including only the real map indexes INDEX0 and INDEX1 is provided. However, according to the illustrated embodiment of FIGS. 2 and 3, a super block additionally including the virtual map indexes INDEX2 and INDEX3 is provided, wherein the virtual map indexes INDEX2 and INDEX3 are addresses beyond a normal address range of an initially defined user-data memory region. For example, the normal address range may be an address range corresponding to the visible region-to-user 350-2 as established during an initialization of the second memory 350.

When a LA of 0 is mapped or assigned to the real map index INDEX0 by the FTL, a number given to a super block (or a meta block) corresponding to the real map index INDEX0 is assumed to be "100". Here, the super block may be a group of blocks, each of which includes a plurality of pages. It is assumed that a super block SB100 includes a plurality of physical pages PA0 through PAn each of which can store 1024 mapping tables, where "n" is a natural number.

A mapping table TB1 stored in a first region of the first physical page PA0 in the super block SB100 may be selected by the LA of 0, and data DATA1 may be read from a first physical page PA0 of a super block (or meta block) SB200 according to mapping information "200, 0" stored in the mapping table TB1. For instance, an operation when data is read from a region corresponding to an LA of 1 may be as follows. When the LA of 1 is mapped or assigned to the real map index INDEX0 by the FTL, a number given to a super block corresponding to the real map index INDEX0 is assumed to be "100".

A mapping table stored in a second region of the first physical page PA0 in the supper block SB100 is selected by the LA of 1 and data DATA2 may be read from a second physical page PA1 in the super block SB200 according to mapping information "200, 1" stored in the mapping table. Similarly, data may be read from a first physical page PA0 in a super block SB200 according to mapping information of "202, 0" stored in a mapping table in a third region of the first physical page PA0 in the supper block SB100 and data may be read from a tenth physical page in the super block SB200 according to mapping information of "202, 9" stored in a mapping table in a 1024th region of the first physical page PA0 in the supper block SB100.

For instance, when the LA is (1024*n+1), the FTL may assign or map the real map index INDEX1. A number given to a super block corresponding to the real map index INDEX1 is "101". The super blocks SB100 and SB200 are stored in the visible region-to-user 350-2.

Figure 4:
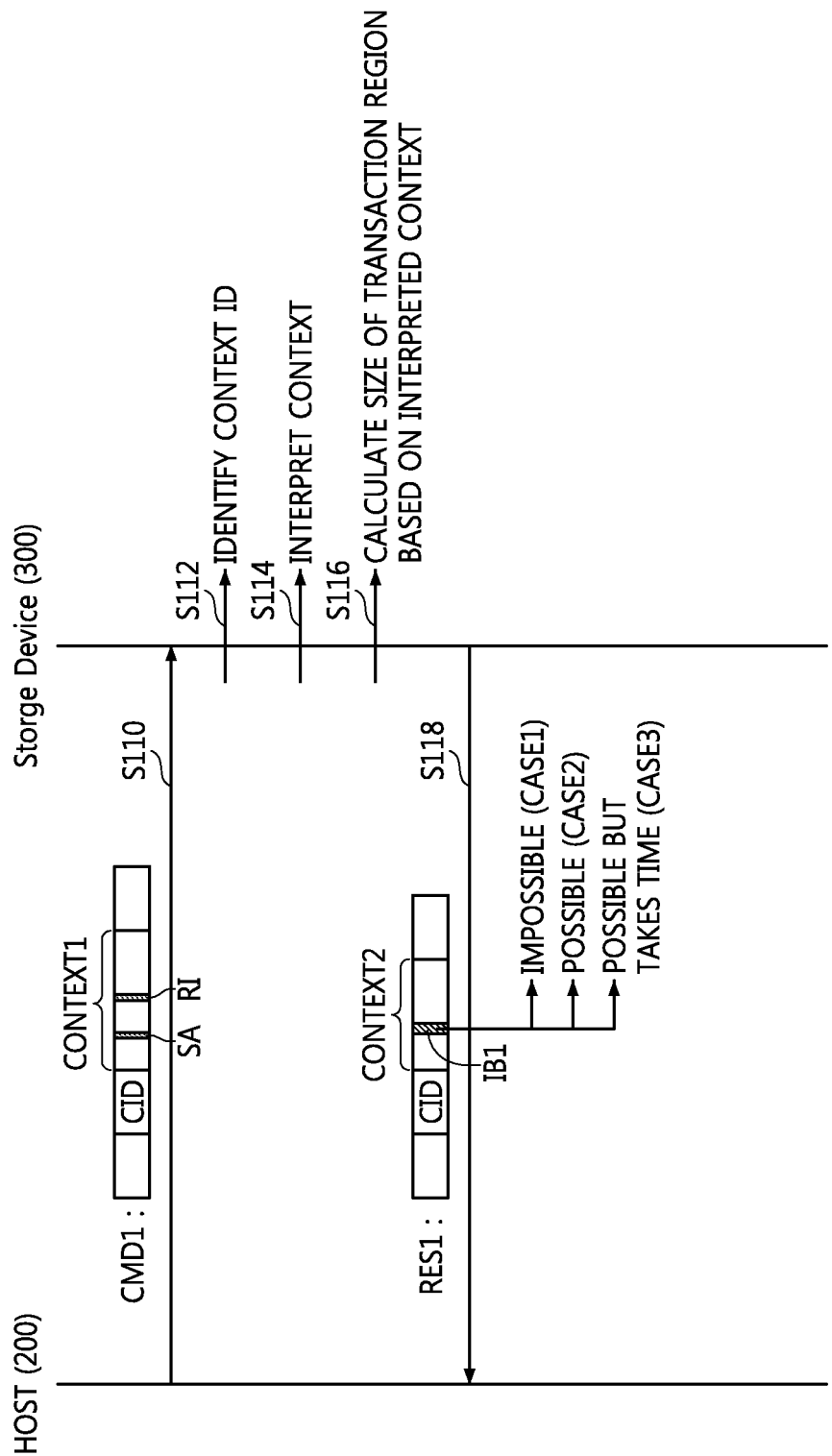
FIGS. 4 and 5 are respective operating diagrams illustrating the flow of data in relation to certain operations performed by the data processing system of FIG. 1.

FIG. 4 illustrates a flow of data during certain operations of the data processing system 100 shown in FIG. 1. Referring to FIGS. 1, 2, 3 and 4, the host 200 communicates a command CMD1 including a context ID CID and a transaction context CONTEXT1 to the data storage device 300 (S110). The transaction context CONTEXT1 includes a start address SA and range information RI.

Size information of a transaction region needed for a data transaction may be determined depending on the start address SA and the range information RI. The CPU 317 in the data storage device 300 receives the command CMD1 from the host 200 via the host interface 313 and first memory controller 315 in operation S110. In other words, the CPU 317 of the data storage device 300 receives the size information (e.g., the start address SA and the range information RI) of the transaction region needed for the data transaction in operation S110.

The CPU 317 then identifies the context ID CID in the command CMD1 (S112) and interprets or decodes the transaction context CONTEXT1 in the command CMD1 (S114). The CPU 317 calculates a sum of a size of a first region available in the invisible region-to-user 350-1 and a size of a second region, e.g., 350-3 or 350-6, available in the visible region-to-user 350-2 based on the size information (S116). Here, the first region available may be a region which can be used at present or which can be used when a data transaction is performed, that is, when transaction data is communicated in the invisible region-to-user 350-1. The second region available may be a region which can be used at present or which can be used when a data transaction is performed in the visible region-to-user 350-2. In other words, when garbage collection is performed, the size of a region available when a data transaction is performed may be greater than the current available size of a region.

The second region 350-6 available may include the free region 350-3 and the region 350-5 which is used as a free region due to garbage collection in the visible region-to-user 350-2. Here, a region corresponding to a sum of the first region available and the second region available may be referred to as an "actually available region". In certain data transactions such as an OS image update, the actually available region may indicate a transaction region.

After calculating the sum, the CPU 317 communicates a response RES1 indicating the possibility of executing the data transaction to the host 200 based on the calculation result in operation S118. The response RES1 includes the context ID CID and a transaction context CONTEXT2. The transaction context CONTEXT2 may include indicator bits IB1 that indicate whether the data transaction is possible or not. The indicator bits IB1 may include at least two bits.

In a first case CASE1 in which the size of a transaction region is greater than the size of an actually available region even when garbage collection is performed on the regions 350-1 and 350-2, the CPU 317 communicates the response RES1, which includes the indicator bits IB1 indicating that a data transaction is impossible, to the host 200.

In a second case CASE2 in which the size of an actually available region at present is greater than the size of a transaction region, the CPU 317 communicates the response RES1, which includes the indicator bits IB1 indicating that a data transaction is possible or immediately possible, to the host 200. In this case, garbage collection does not need to be performed on the regions 350-1 and 350-2.

In a third case CASES in which the size of an actually available region after garbage collection is performed on the regions 350-1 and 350-2 is greater than the size of a transaction region, the CPU 317 communicates the response RES1, which includes the indicator bits IB1 indicating that a data transaction is possible but takes time, to the host 200. Here, time is required to perform garbage collection on the regions 350-1 and 350-2.

Figure 5:
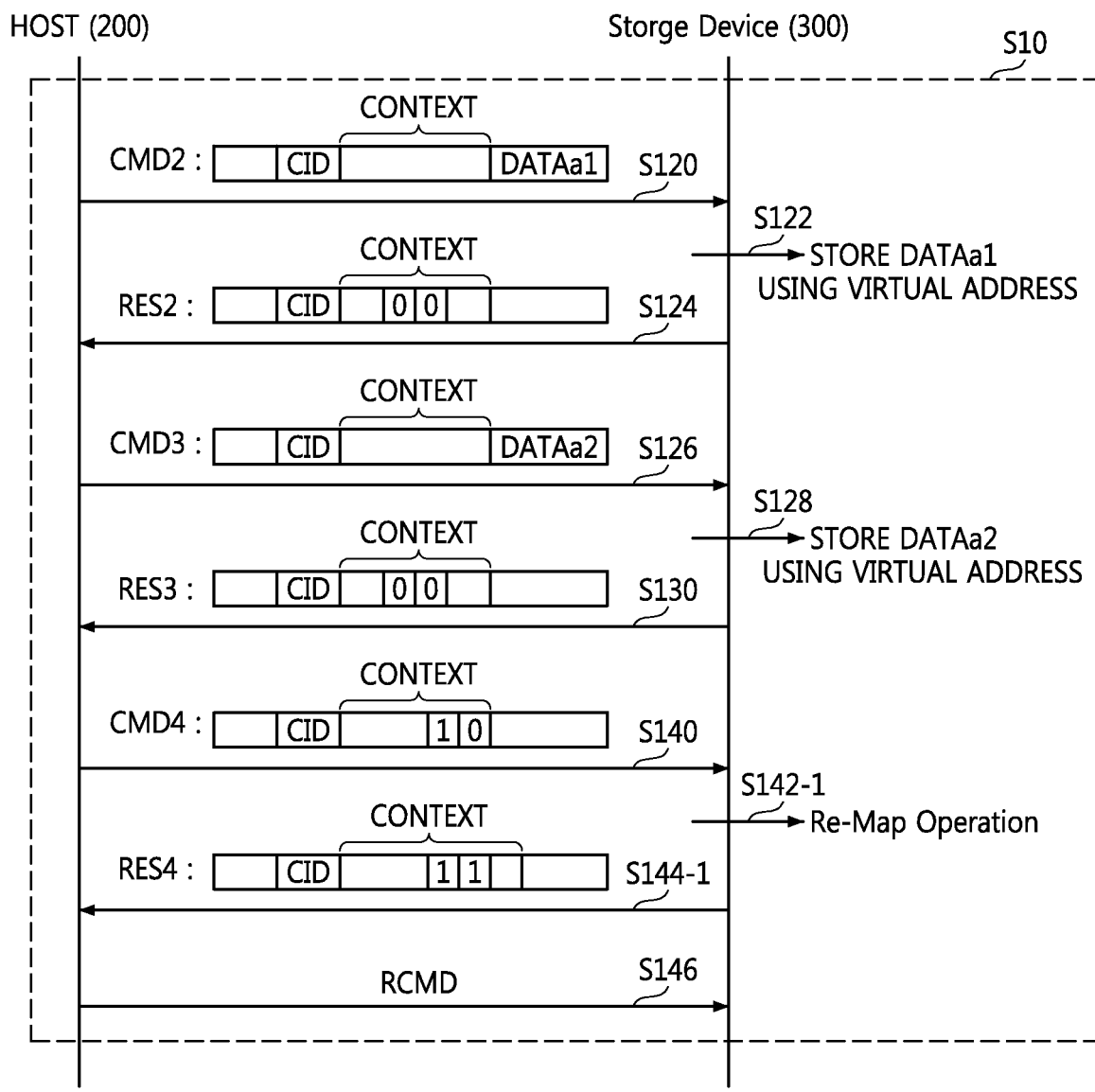

FIG. 5 illustrates a flow of data for various operations performed by the data processing system 100 in the second case CASE2 described in relation to FIG. 4. For clarity of the description, it is assumed that transaction data includes two data (DATAa1 and DATAa2) in the data flow illustrated in FIG. 5.

Referring now to FIGS. 1, 2, 3, 4 and 5, the host 200 communicates a command CMD2, which includes a context ID CID, a transaction context CONTEXT, and the transaction data DATAa1, to the data storage device 300 based on the response RES1 including the indicator bits IB1 indicating that a data transaction is possible or immediately possible (S120).

The data storage device 300 may store the transaction data DATAa1 in a transaction region using a virtual address generated according to a virtual map (S122). At this time, a virtual map generating operation may be performed. The virtual map generating operation and/or the operation of storing the transaction data DATAa1 will be described in detail with reference to FIG. 6 later.

After storing the transaction data DATAa1 in the transaction region, the data storage device 300 may communicate a response RES2 including a context ID CID and a transaction context CONTEXT to the host 200 (S124). The transaction context CONTEXT may include indicator bits (e.g., "00"), which may indicate that a re-map operation has not been performed. Then, the host 200 communicates a command CMD3 including a context ID CID, a transaction context CONTEXT, and the transaction data DATAa2 to the data storage device 300 (S126).

The data storage device 300 may store the transaction data DATAa2 in the transaction region using a virtual address generated according to a virtual map (S128). At this time, a virtual map generating operation may be performed. The virtual map generating operation and/or the operation of storing the transaction data DATAa2 will be described in some additional detail hereafter with reference to FIG. 6.

After storing the transaction data DATAa2 in the transaction region, the data storage device 300 may communicate a response RES3 including a context ID CID and a transaction context CONTEXT to the host 200 (S130). The transaction context CONTEXT may include indicator bits (e.g., "00").

After the transaction data DATAa1 and DATAa2 are stored in the transaction region, the host 200 communicates a command CMD4 including a context ID CID and a transaction context CONTEXT to the data storage device 300 (S140). At this time, the transaction context CONTEXT may include indicator bits (e.g., "10"). Among the indicator bits, e.g., "10", the first indicator bit "1" may indicate the termination of a data transaction. In other words, the first indicator bit "1" may instruct to start a re-map operation.

When sudden power off (SPO) event occurs while the transaction data DATAa2 is being written to the transaction region, the host 200 again communicates only the command CMD3 including the context ID CID, the transaction context CONTEXT, and the transaction data DATAa2 to the data storage device 300 because it has received the response RES2. However, when SPO occurs while transaction data DATAa2 is being written to the transaction region in a conventional data processing system, the transaction data DATAa1 that has already been communicated is also communicated to a data storage device 300.

The data storage device 300 may perform the re-map operation in response to the first indicator bit "1" indicating the termination of the data transaction (S142-1). One possible approach to the re-map operation will be described hereafter in some additional detail with reference to FIG. 7.

When a SPO event occurs before the completion of the re-map operation, the data storage device 300 may again perform the re-map operation. After completing the re-map operation, the data storage device 300 may communicate a response RES4 including a context ID CID and a transaction context CONTEXT to the host 200 (S144-1). At this time, the transaction context CONTEXT may include indicator bits (e.g., "11").

Among the indicator bits, e.g., "11", the second indicator bit "1" may indicate the completion of the re-map operation. The host 200 may communicate a read command RCMD to read data from the transaction region to the data storage device 300 (S146). The read command RCMD may include a context ID CID and a transaction context CONTEXT. One possible read operation performed by the data storage device 300 in response to the read command RCMD will hereafter be described in some additional detail with reference to FIG. 8.

Figure 6:
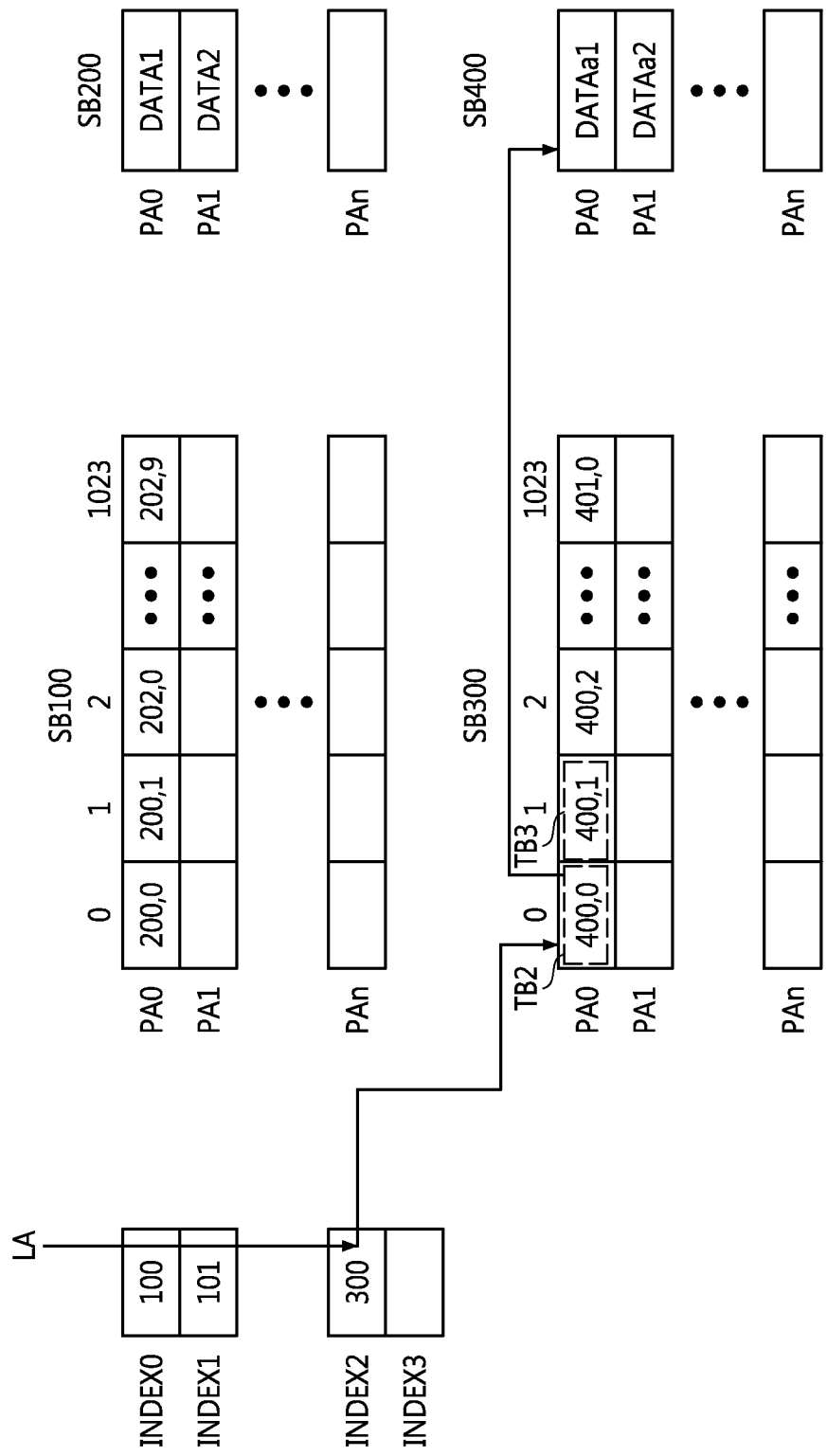
FIG. 6 is a conceptual diagram illustrating in one example a method of storing data using a virtual address in the data processing system of FIG. 1.

FIG. 6 is a conceptual diagram illustrating in one example a method of storing data using a virtual address in the data processing system 100 of FIG. 1. Referring to FIGS. 1, 2, 3, 4, 5 and 6, an LA of 0 is mapped or assigned by the FTL to the virtual map index INDEX2. At this time, a number given to a super block corresponding to the virtual map index INDEX2 is "300".

It is assumed that a super block SB300 includes a plurality of physical pages PA0 through PAn and each of the physical pages PA0 through PAn can store 1024 mapping tables therein. A procedure in which the transaction data DATAa1 is written to a super block SB400 included in the transaction region will now be described.

A mapping table TB2 stored in a first region 0 of the first physical page PA0 in the super block SB300 is selected according to the LA of 0. The transaction data DATAa1 may be stored in a first physical page PA0 in the super block SB400 according to mapping information "400, 0" stored in the mapping table TB2. In other words, the transaction data DATAa1 corresponding to the LA of 0 may be stored in the first physical page PA0 in the super block SB400 according to a virtual address "400, 0" generated based on the virtual map or virtual mapping table TB2.

A mapping table stored in a second region 1 of the first physical page PA0 in the super block SB300 is selected according to an LA of 1. The transaction data DATAa2 may be stored in a second physical page PA1 in the super block SB400 according to mapping information "400, 1" stored in the selected mapping table. In other words, the transaction data DATAa2 corresponding to the LA of 1 may be stored in the second physical page PA1 in the super block SB400 according to a virtual address "400, 1" generated based on a virtual map or virtual mapping table. At this time, the super blocks SB100 and SB200 may be included in the used region 350-4 and the supper blocks SB300 and SB400 may be included in the actually available region 350-1 or 350-6.

Figure 7:
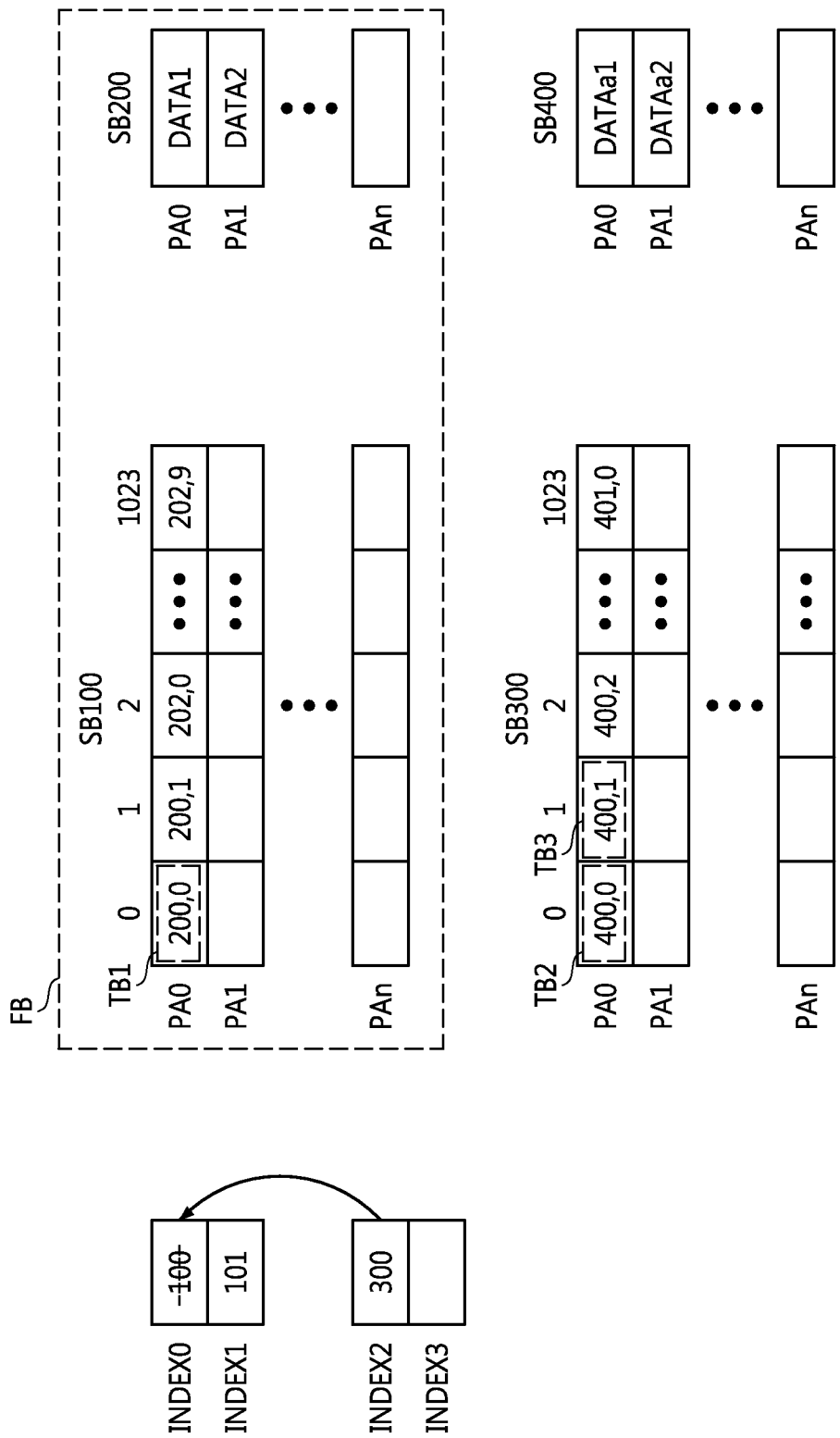
FIG. 7 is a conceptual diagram illustrating in one example a re-map operation that may be performed by the data processing system of FIG. 1.

FIG. 7 is a conceptual diagram illustrating in one example a re-map operation that may be performed by the data processing system 100 of FIG. 1. As a result of the re-map operation S142-1 illustrated in FIG. 5, the number "100" of the super block corresponding to the real map index INDEX0 may be updated or re-mapped to the number "300" of the super block corresponding to the virtual map index INDEX2. At this time, the super block SB100 mapped to the real map index INDEX0 is unmapped and becomes a free block FB. The super block SB200 mapped to the super block 100 is also unmapped and becomes the free block FB.

The data storage device 300 according to the current embodiments directly write the transaction data DATAa1 and DATAa2 to the physical pages PA0 and PA1, respectively, in the super block SB400 and does not perform an overwrite operation.

Figure 8:
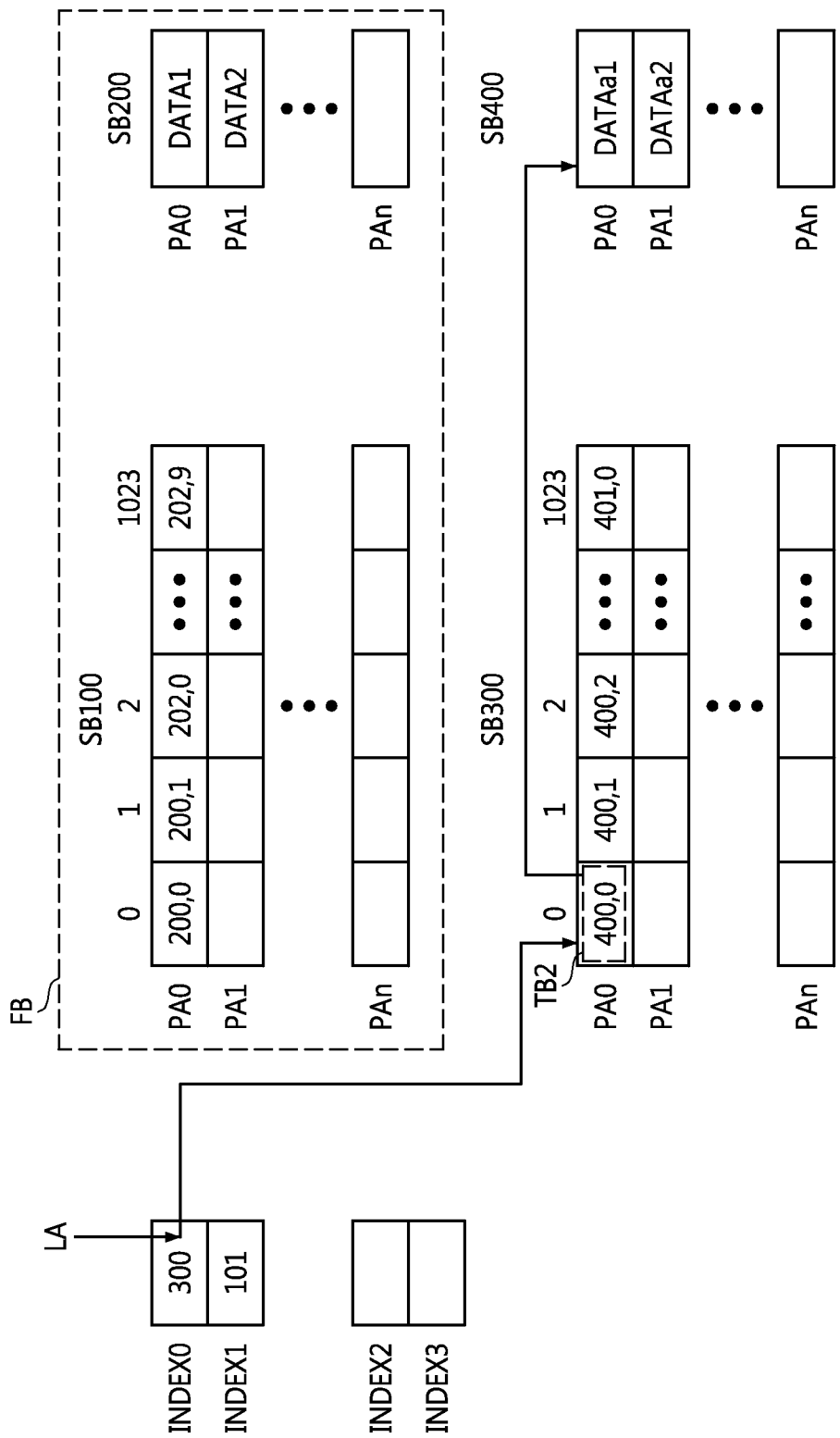
FIG. 8 is a conceptual diagram illustrating in one example a read operation that may be performed following a re-map operation by the data processing system of FIG. 1.

FIG. 8 is a conceptual diagram illustrating in one example a read operation that may be performed following the re-map operation of the data processing system 100 shown in FIG. 1. When the LA of 0 is mapped or assigned to the real map index INDEX0 by the FTL, a number given to a super block mapped to the real map index INDEX0 is not "100" but "300".

As a result, the super block SB300 is selected based on the super block number "300" mapped to the real map index INDEX0 and the mapping table TB2 stored in a first region of the first physical page PA0 in the super block SB300 corresponding to the LA of 0 is selected. According to the mapping information "400, 0" stored in the mapping table TB2, the transaction data DATAa1 is read from the first physical page PA0 in the super block SB400.

When the LA of 1 is mapped or assigned to the real map index INDEX0 by the FTL, a super block number mapped to the real map index INDEX0 is not "100" but "300".

As a result, the super block SB300 is selected based on the super block number "300" mapped to the real map index INDEX0 and a mapping table stored in a second region of the first physical page PA0 in the super block SB300 corresponding to the LA of 1 is selected. According to the mapping information "400, 1" stored in the selected mapping table, the transaction data DATAa2 is read from the second physical page PA1 in the super block SB400.

Figure 9:
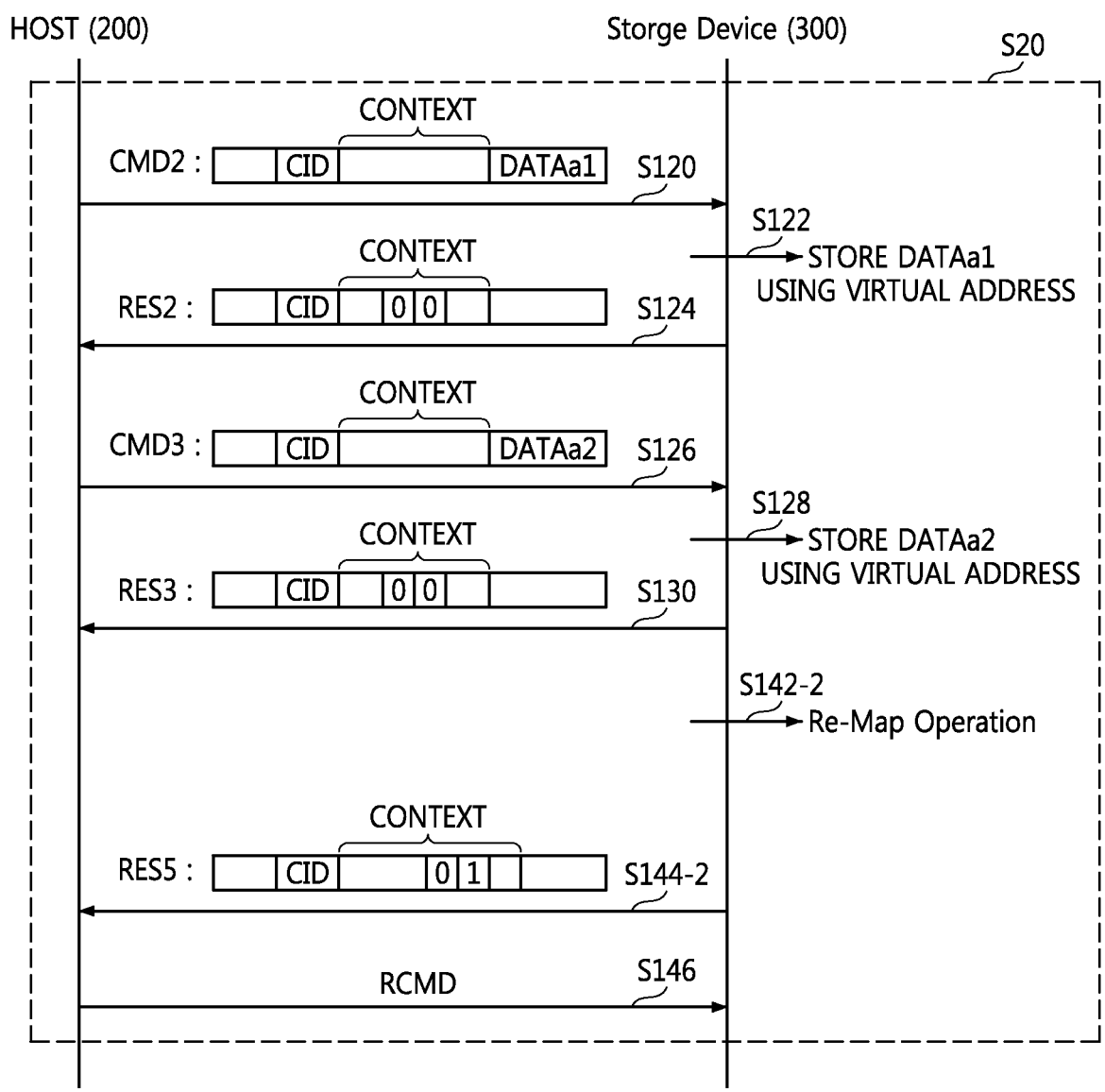
FIG. 9 is an operating diagram illustrating in one example a re-map operation that may be performed using the second memory 350 of FIG. 1.

FIG. 9 is a conceptual diagram illustrating in one example a re-map operation that may be performed in the second memory 350 shown in FIG. 1. Referring to FIGS. 5 and 9, the re-map operation is performed based on the indicator bits (e.g., "10") included in the transaction context CONTEXT output from the host 200 in operation S142-1. However, the re-map operation is performed in the data storage device 300 regardless of the command CMD4 output from the host 200 in operation S142-2 in the embodiments illustrated in FIG. 9.

Thus, when the transaction data DATAa1 and DATAa2 are stored in the transaction region, the data storage device 300 performs the re-map operation by itself and then communicates a response RES5 including a context ID CID and a transaction context CONTEXT to the host 200. At this time, the transaction context CONTEXT includes indicator bits (e.g., "01"). Among the indicator bits "01", a second indicator bit "1" indicates the termination of the re-map operation.

Figure 10:
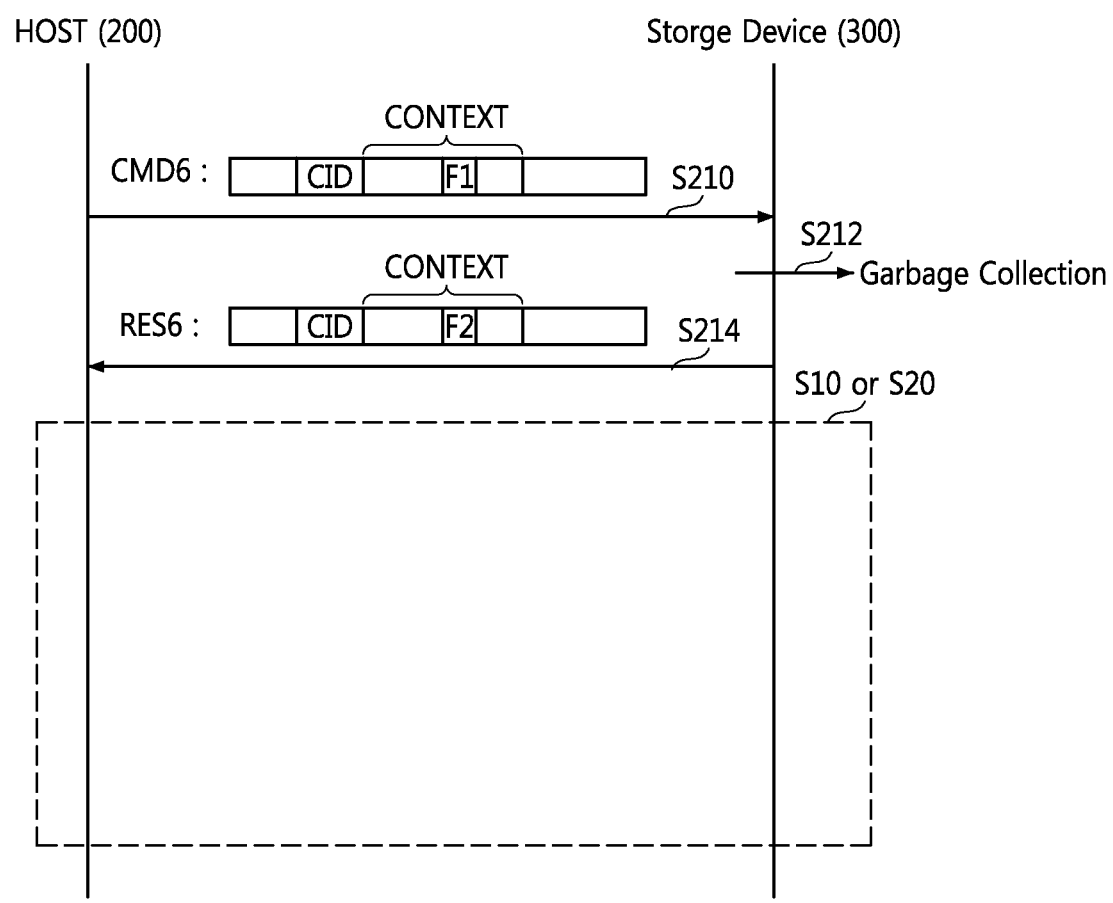
FIG. 10 is an operating diagram illustrating a flow of data in relation to certain operations performed by the data processing system of FIG. 1.

FIG. 10 illustrates a flow of data describing operations performed by the data processing system 100 in the third case CASES illustrated in FIG. 4. The host 200 communicates a command CMD6, which includes a context ID CID and a transaction context CONTEXT, to the data storage device 300 based on the response RES1 including the indicator bits IB1 indicating that a data transaction is possible but takes time (S210). At this time, the transaction context CONTEXT may include an indicator bit F1 having a first value instructing to perform garbage collection. The indicator bit F1 may be a flag indicating a particular flag state (e.g., YES/NO).

The data storage device 300 performs garbage collection on the first region and/or the second region in response to the indicator bit F1 having the first value (S212). When a SPO event occurs during garbage collection, the data storage device 300 may again perform the garbage collection.

When an actually available region is secured as a result of performing the garbage collection, the data storage device 300 communicates a response RES6 including the context ID CID and a transaction context CONTEXT to the host 200 (S214). At this time, the transaction context CONTEXT may include an indicator bit F2 having a second value indicating the completion of the garbage collection. In other words, the host 200 may monitor that the indicator bit F1 having the first value is changed to the indicator bit F2 having the second value.

The host 200 may perform the method S10 of FIG. 5 or the method S20 of FIG. 9 using the data storage device 300 in response to the indicator bit F2 having the second value.

Figure 11:
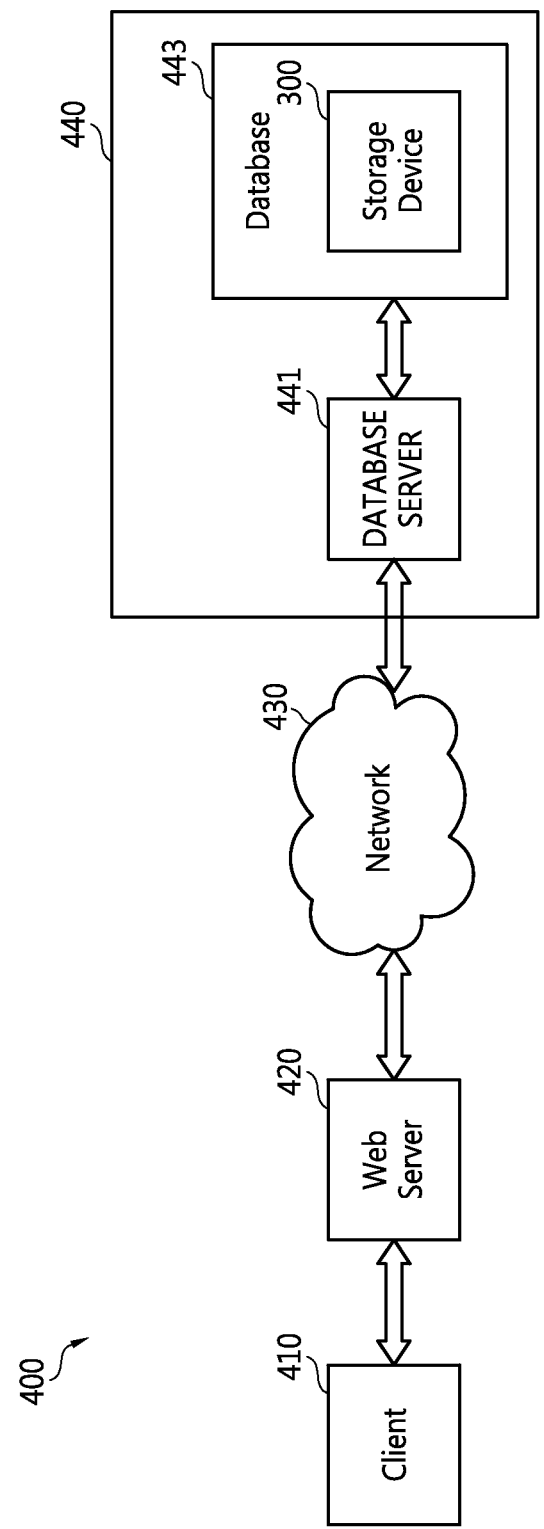
FIG. 11 is a general block diagram of a data processing system according to certain embodiments of the inventive concept.

FIG. 11 is a block diagram illustrating a data processing system 400 according to certain other embodiments of the inventive concept. Referring to FIGS. 1 through 11, the data processing system 400 includes a client computer 410, a web server 420, a network 430, and a data processor 440. The data processor 440 includes a database server 441 and a database 443. The data processing system 400 may be a search portal or an internet data center (IDC).

The client computer 410 may communicate with the web server 420 through a network. The client computer 410 may be implemented as a PC, a laptop computer, a smart phone, a tablet PC, a PDA, a MID, a wearable computer, an IoT device, or an IoE device. The web server 420 may communicate with the database server 441 through the network 430. The database server 441 may function as the host 200 illustrated in FIG. 1.

The database server 441 may control the operations of the database 443. The database server 441 may access at least one database 443.

The at least one database 443 includes at least one data storage device 300. The web server 420 and the database server 441 may communicate with each other through the network 430. The network 430 may be a wired network, a wireless network, an internet, or a cellular network.

As described above, according to some embodiments of the inventive concept, a data processing system and a method of operating the same enable a memory region set for OS image update to be used to store user data, thereby increasing the size of a memory region for the user data. In addition, the data processing system and the method increase a transaction data write reliability and processing speed even when a SPO event occurs. Consequently, the data processing system and the method ensure the atomicity of transaction data.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating a data storage device, the method comprising:
   receiving size information for a region associated with a data transaction requested by a host;
   calculating a sum of a first size of a first region available in an invisible region-to-user and a second size of a second region available in a visible region-to-user based on the size information, wherein the second region comprises a used region capable of being converted to a free region by performing garbage collection in the visible region-to-user, and the garbage collection is performed based on a flag state provided by the host in response to the response;
   communicating a response indicating possibility of executing the data transaction to the host based on the calculation sum;
   changing the flag state when an actually available region corresponding to the calculated sum is secured by performing garbage collection;
   communicating a changed flag state to the host to enable the host to begin execution of the data transaction;
   receiving transaction data from the host based on the changed flag state;
   assigning a logical address associated with the transaction data to a virtual map index among a real map index and the virtual map index; and
   writing the transaction data to a first data region in the actually available region using a virtual mapping table corresponding to a number given to a first super block corresponding to the virtual map index.

2. The method of claim 1, wherein the invisible region-to-user comprises an over-provisioning region.

3. The method of claim 1, further comprising:
   changing a number given to a second super block corresponding to the real map index to a number given to the first super block after the writing the transaction data to the first data region; and
   communicating an indicator signal indicating the changing of the number given to the second super block to the host.

4. The method of claim 3, further comprising;
receiving a read command from the host;
assigning a logical address corresponding to the read command to the real map index;
reading the transaction data from the first data region using the virtual mapping table corresponding to the number given to the first super block corresponding to the real map index; and
communicating the transaction data to the host.

5. The method of claim 1, further comprising:
receiving an end signal indicating termination of the data transaction from the host;
changing a number given to a second super block corresponding to the real map index into the number given to the first super block in response to the end signal; and
communicating an indicator signal indicating the changing of the number given to the second super block to the host.

6. The method of claim 5, further comprising;
receiving a read command from the host;
assigning a logical address corresponding to the read command to the real map index; and
reading the transaction data from the first data region using the virtual mapping table corresponding to the number given to the first super block corresponding to the real map index and communicating the transaction data to the host.

7. A method of operating a data storage device, the method comprising:
receiving size information for a region associated with a data transaction requested by a host;
calculating a sum of a first size of a first region available in an invisible region-to-user and a second size of a second region available in a visible region-to-user based on the size information;
communicating a response indicating possibility of executing the data transaction to the host based on the calculation sum;
receiving transaction data from the host based on the response;
assigning a logical address of the transaction data to a virtual map index among a real map index and the virtual map index; and
writing the transaction data to a first data region in the actually available region using a virtual mapping table corresponding to a number given to a first super block corresponding to the virtual map index.

8. The method of claim 7, further comprising:
changing a number given to a second super block corresponding to the real map index into the number given to the first super block after the writing the transaction data to the first data region is completed; and
communicating an indicator signal indicating completion of change to the host.

9. The method of claim 8, further comprising;
receiving a read command from the host;
assigning a logical address corresponding to the read command to the real map index; and
reading the transaction data from the first data region using the virtual mapping table corresponding to the number given to the first super block corresponding to the real map index and communicating the transaction data that has been read to the host.

10. The method of claim 7, further comprising:
receiving an end signal indicating termination of the data transaction from the host;
changing a number given to a second super block corresponding to the real map index into the number given to the first super block in response to the end signal; and
communicating an indicator signal indicating completion of the changing of the number given to the second super block.

11. The method of claim 10, further comprising;
receiving a read command from the host;
assigning a logical address corresponding to the read command to the real map index; and
reading the transaction data from the first data region using the virtual mapping table corresponding to the number given to the first super block corresponding to the real map index and communicating the transaction data that has been read to the host.

12. A method of operating a data processing system including a data storage device and a host, the method comprising:
receiving size information in the data storage device for a region associated with a data transaction requested by the host;
in the data storage device, calculating a sum of a first size of a first region available in an invisible region-to-user and a second size of a second region available in a visible region-to-user based on the size information, wherein the second region comprises a used region capable of being converted to a free region by executing garbage collection in the visible region-to-user;
communicating a response indicating possibility of executing the data transaction from the data storage device to the host based on the calculated sum;
receiving transaction data from the host based on the response;
assigning a logical address of the transaction data to a virtual map index among a real map index and the virtual map index;
writing the transaction data to a first data region in the actually available region using a virtual mapping table corresponding a number given to a first super block corresponding to the virtual map index;
changing a number given to a second super block corresponding to the real map index into a number given to the first super block after the writing the transaction data to the first data region is completed; and
communicating an indicator signal indicating completion of the changing of the number given to the second super block to the host.

13. The method of claim 12, further comprising:
receiving an end signal indicating termination of the data transaction from the host;
changing the number given to the second super block corresponding to the real map index into the number given to the first super block in response to the end signal.

14. A method of operating a data storage device, the method comprising:
receiving size information for a region associated with a data transaction requested by a host;
calculating a sum of a first size of a first region available in an invisible region-to-user and a second size of a second region available in a visible region-to-user based on the size information, wherein the second region comprises a used region capable of being converted to a free region by performing garbage collection in the visible region-to-user, and the garbage collection is performed based on a flag state provided by the host in response to the response;

communicating one of a group of possibility cases related to the execution of the data transaction to the host based on the calculation sum, wherein the group of possibility cases comprises an impossible case, a possible case, and a possible with time case;

changing the flag state when an actually available region corresponding to the calculated sum is secured by performing garbage collection;

communicating a changed flag state to the host to enable the host to begin execution of the data transaction;

receiving transaction data from the host based on the changed flag state;

assigning a logical address associated with the transaction data to a virtual map index among a real map index and the virtual map index; and writing the transaction data to a first data region in the actually available region using a virtual mapping table corresponding to a number given to a first super block corresponding to the virtual map index.

* * * * *